(12) United States Patent
Henry et al.

(10) Patent No.: US 6,758,265 B2
(45) Date of Patent: Jul. 6, 2004

(54) TEMPERATURE CONTROL STRATEGY FOR A REAR CONTROL SYSTEM

(75) Inventors: Jamie Jarett Henry, Plymouth, MI (US); Robert Joseph Malkowski, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 157 days.

(21) Appl. No.: 09/997,362

(22) Filed: Nov. 30, 2001

(65) Prior Publication Data

US 2003/0102120 A1 Jun. 5, 2003

(51) Int. Cl.⁷ .................................. B60H 1/00
(52) U.S. Cl. ................. 165/203; 165/288; 165/289; 165/42; 454/75; 454/156
(58) Field of Search .................. 165/42, 43, 202, 165/203, 204, 288, 289; 62/244; 236/1 R, 1 B, 49.3; 454/75, 156

(56) References Cited

U.S. PATENT DOCUMENTS

| | | | |
|---|---|---|---|
| 4,570,450 A | * | 2/1986 | Takemi et al. |
| 4,586,652 A | * | 5/1986 | Sakurai ................ 165/43 X |
| 4,665,971 A | * | 5/1987 | Sakurai ................ 165/43 X |
| 4,762,169 A | | 8/1988 | Anderson et al. |
| 4,800,951 A | * | 1/1989 | Sakurai ................ 165/43 X |
| 4,856,710 A | * | 8/1989 | Takada et al. ........ 165/43 X |
| 4,901,788 A | * | 2/1990 | Doi ........................ 165/43 X |
| 5,078,316 A | | 1/1992 | Hara et al. |
| 5,086,628 A | | 2/1992 | Hashimoto |
| 5,452,587 A | | 9/1995 | Honda et al. |
| 5,516,041 A | | 5/1996 | Davis, Jr. et al. |
| 5,572,881 A | * | 11/1996 | Hotta et al. |
| 5,715,997 A | | 2/1998 | Ito et al. |
| 5,725,052 A | | 3/1998 | Kawai et al. |
| 5,803,166 A | * | 9/1998 | Ito et al. ................ 165/203 |
| 6,118,099 A | | 9/2000 | Lake et al. |
| 6,131,652 A | * | 10/2000 | Ito et al. ................ 165/204 |
| 6,155,061 A | | 12/2000 | Davis, Jr. et al. |
| 6,209,331 B1 | | 4/2001 | Lake et al. |
| 6,223,544 B1 | | 5/2001 | Seem |
| 6,250,382 B1 | | 6/2001 | Rayburn et al. |

* cited by examiner

Primary Examiner—L V Ciric
(74) Attorney, Agent, or Firm—Brinks Hofer Gilson & Lione

(57) ABSTRACT

A heating/cooling control system that can effectively control the temperature of the air discharged at the rear interior of the motor vehicle. The heating/cooling control system includes a front control and a rear control. The front control is capable of operating within a predetermined temperature range. The temperature range of the rear control is determined by the set point of the front control.

10 Claims, 3 Drawing Sheets

TEMPERATURE CONTROL STRATEGY FOR A REAR CONTROL SYSTEM

TECHNICAL FIELD OF THE INVENTION

This invention relates to a Heat Ventilation and Air Conditioning (HVAC) system installed in a motor vehicle. More specifically, this invention relates to a control strategy for controlling temperature of the air discharged at the rear of the motor vehicle.

BACKGROUND OF THE INVENTION

Typically in today's HVAC system installed in motor vehicles, controls are provided for controlling the front climate control and the rear climate control. However, the current technology for rear temperature control from the front control normally utilizes slide lever controls or rotary knobs, which allows for infinite temperature selection over a wide range.

The current problems associated with using rocker or push buttons to control the temperature of the rear climate control system from the front climate control is that the temperature change that corresponds to one increment of the rocker button selection is very large due to the large operating range of the HVAC system and limited indicators directed by styling. To achieve appropriate indication to the customer regarding temperature selection over the entire operating range would require a large amount of displays, these solutions are costly and may be difficult to package. For example, typical discharge air temperature range of the rear climate control system is 120° F. (160° F. to 40° F.). Typically the number of LED indicators allowed is limited by styling direction and cost. For example if the styling dictates five LED buttons, the temperature gradient per LED (assumed evenly distributed and one LED per button push) is 120° F./5=24° F. As seen, this temperature gradient per button push is much too large to achieve occupant comfort.

Therefore, there is a need in the industry to control the rear climate control system such that the temperature gradient of the rear system has smaller increments.

SUMMARY OF THE INVENTION

In accordance with the preferred embodiment of the present invention, a control strategy for controlling the temperature of the rear climate control system is disclosed. Preferably, the temperature range of the rear system is controlled by the front control system set point.

Preferably, the temperature selected in the front control system determines the selectable temperature range of the air discharged from the rear control system. According to the preferred embodiment, the temperature of the front system is set as the median temperature of the rear control system. Therefore, any temperature range of the rear control system is measured from the set point of the front control system.

BRIEF DESCRIPTION OF THE DRAWINGS

Further features of the invention will become apparent from the following discussion and the accompanying drawings in which.

DETAILED DESCRIPTION OF THE PREFERRED EMBODIMENT

Figure 1:
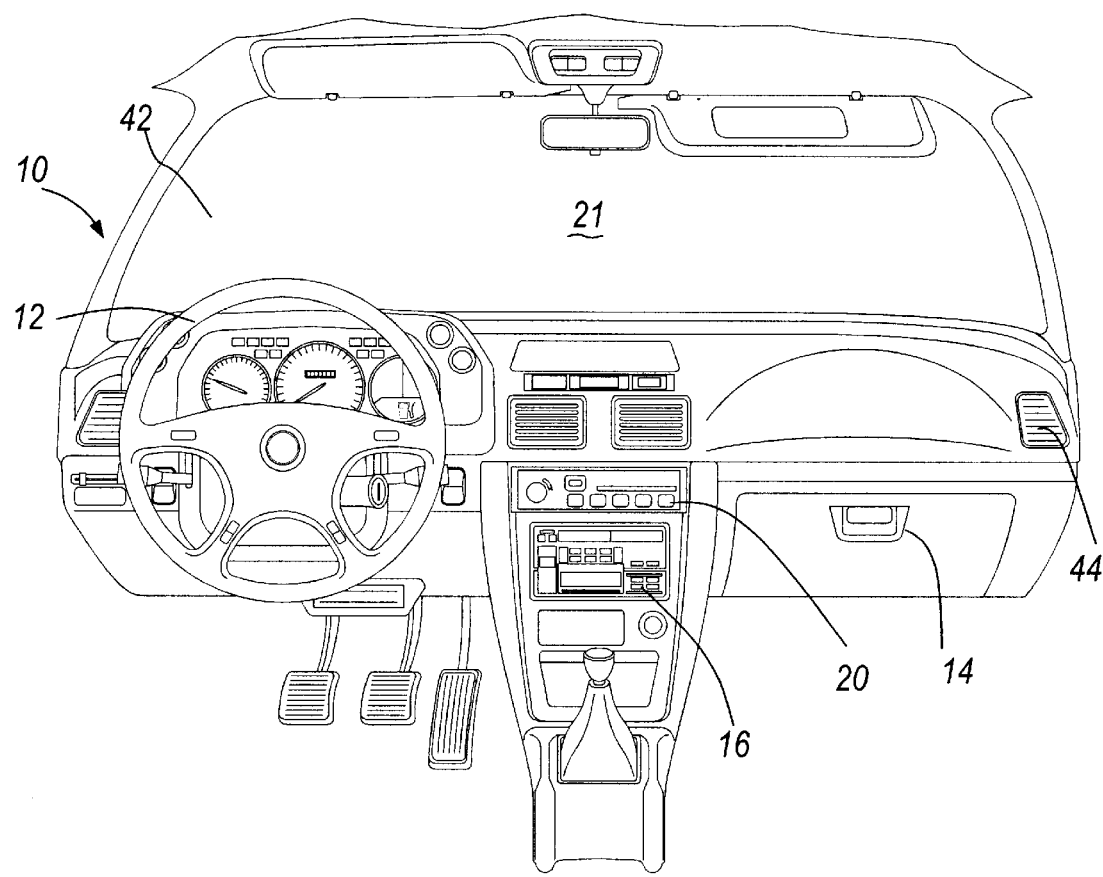
FIG. 1 is a front view of the instrument panel as installed in a motor vehicle in accordance with the teachings of the present invention.

The following description of the preferred embodiment is merely exemplary in nature and is in no way intended to limit the invention or its application or uses.

Referring in particular to the drawings, an instrument panel incorporating the temperature control strategy of the present is shown and designated by reference numeral 10.

As shown in FIG. 1, the instrument panel 10 is installed in the interior 21 of a motor vehicle and includes a steering wheel 12, a glove compartment 14, an audio system 16, an HVAC system (not shown in FIG. 1), controlling inputs 20 and front vents 44 for discharging air into the interior 21 of the motor vehicle 21.

Figure 2:
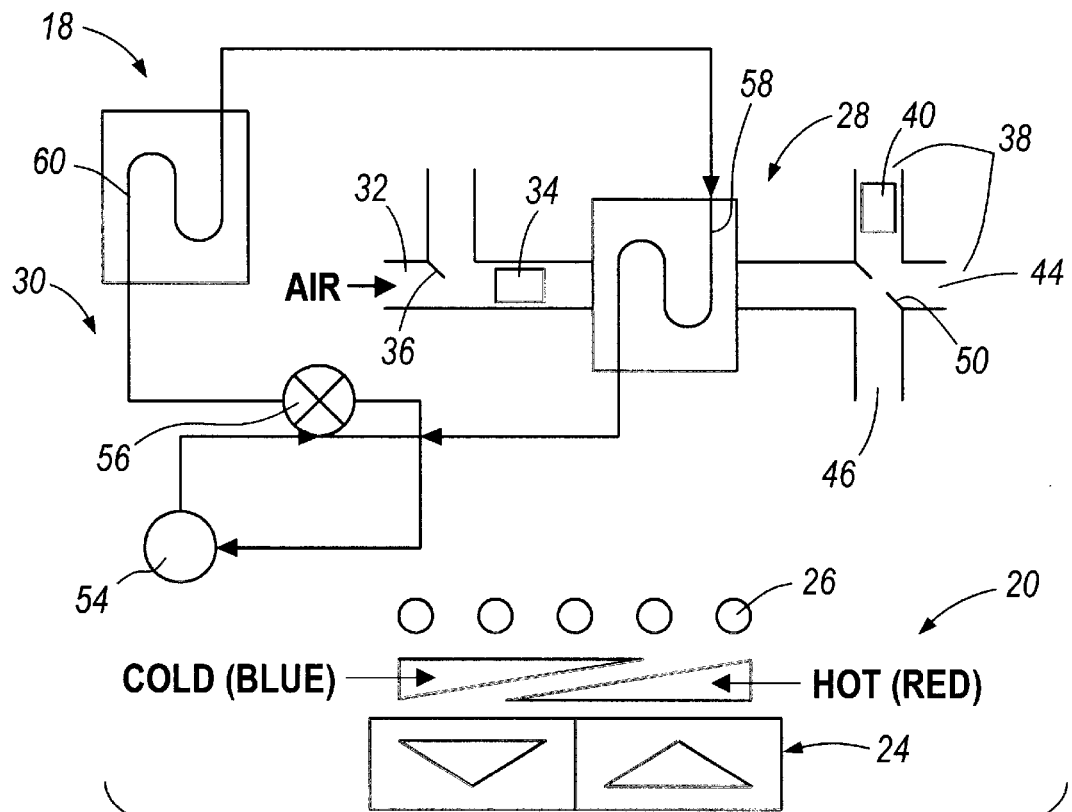
FIG. 2 is a view of the HVAC system having the front air flow system installed in a motor vehicle in accordance with the teachings of the present invention.

As shown in FIG. 2 and will be explained in details later, the controlling inputs 20, include a rocker button 24 and a display unit 26 that display the temperature selected. Although in the drawings LED indicators are shown as the display unit 26 it must be understood that the display units 26 are not limited to this form. The controlling inputs 20 provide controls to regulate the temperature of the air discharged into the interior 21 of the motor vehicle and can be operated by the front occupants (driver and the front passenger) of the motor vehicle.

Figure 3:
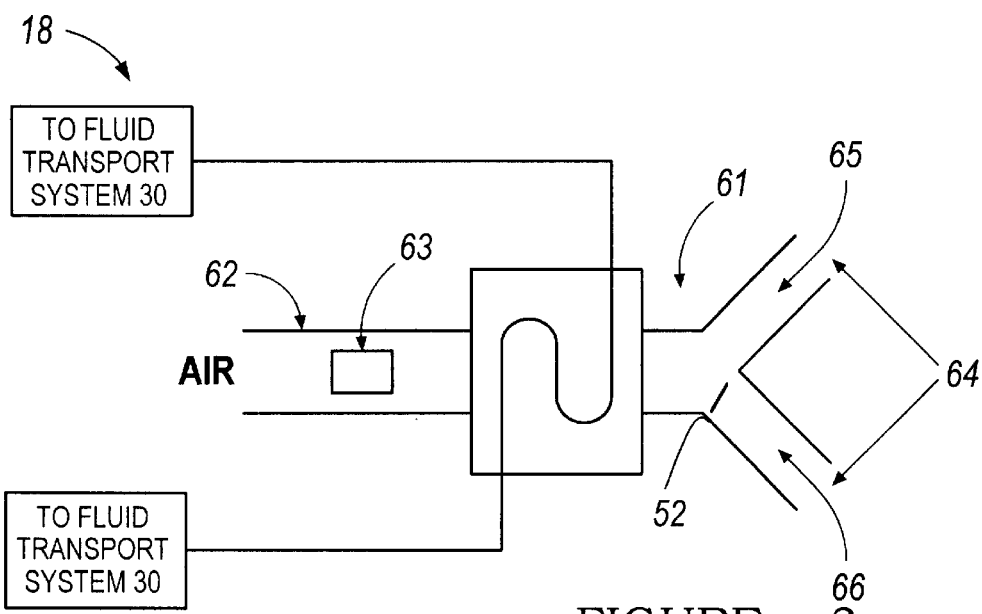
FIG. 3 is a view of the HVAC system having the rear air flow system installed in a motor vehicle in accordance with the teachings of the present invention.

Referring in particular to FIG. 2, an HVAC system is generally shown and represented by reference numeral 18. Preferably, the HVAC system 18 of the present invention is a combination HVAC system that can both heat and cool the interior 21 of the motor vehicle. The HVAC system 18 includes a front air flow system 28 to control the flow of the air into front interior of the vehicle 21, and a rear air flow system 61 (as shown in FIG. 3) to control the flow of the air into rear interior of the vehicle 21. The HVAC system 18 also includes a fluid transport and heat exchanger system 30 that acts as a transfer medium for heat energy and a system for a controlling inputs 20.

The front air flow system 28 includes a duct 32 that provides the air into the interior of the motor vehicle 21. Further, it also includes a blower 34 for introducing air into the duct 32, a re-circulation door 36 for controlling the proportion of the fresh air to the re-circulated air and a set of duct vents 38 for discharging air into the passenger compartment. The duct vents 38 include a defrost vent 40 for directing air towards the windshield 42 (shown in FIG. 1), a front vent 44 for directing the air towards the front occupants in a motor vehicle, and a floor vent 46 for directing air towards the feet of the occupants of the motor vehicle.

As shown in FIG. 3, the rear air flow system 61 includes a duct 62 that provides interior vehicle air into the rear HVAC system. Further, it also includes a blower 63 for introducing air into the duct 62, and a set of duct vents 64 for discharging air into the passenger compartment. The duct vents 64 include an upper vent 65 for directing air towards the occupants face level and a lower vent 66 for directing air towards the occupants feet.

The controlling inputs 20 on the instrument panel 10 are connected to a front control 50 that controls the temperature of the air discharged from the front air control system 28 and a rear control 52 that controls the temperature of the air discharged from the rear air control system 61. As will be explained later, the temperature range of the rear control is always controlled by the temperature of the front control.

As shown in FIG. 2, the fluid transport and heat exchanger system 30 is operable in a heating mode and a cooling mode and includes a compressor 54, a switch 56 for controlling the operation of the compressor 54, an internal heat exchanger 58 for transferring energy between the refrigerant and the air flowing into the interior of the motor vehicle 21. In addition the fluid transport and heat exchanger system 30 also includes an external heat exchanger 60 for interfacing with the outside environment.

As explained above the HVAC system 18 is connected to a microprocessor (not shown) that typically regulates the temperature of the air discharged through the front vents 44 and the rear vents 64. In accordance with the teachings of the present invention and as shown in FIG. 3, the front seat occupants can select a particular temperature for the rear seat occupants by pressing the rocker buttons 24. The temperature selected as the set point temperature by the front control 50 (or driver in a dual zone system) is determined to be the reference point for setting the temperature range of the rear control 52. Therefore, the temperature range over which the rear control 52 can be operated is a subset of the temperature range of the front control 50, wherein the temperature of the rear control 52 can either be increased or decreased from the temperature set point of the front control 50. Since the temperature range of the rear control 52 is now a subset of the overall range, the temperature gradient associated with an incremental button push can be reduced, therefore rear occupant comfort level can be more readily achieved.

Figure 4:
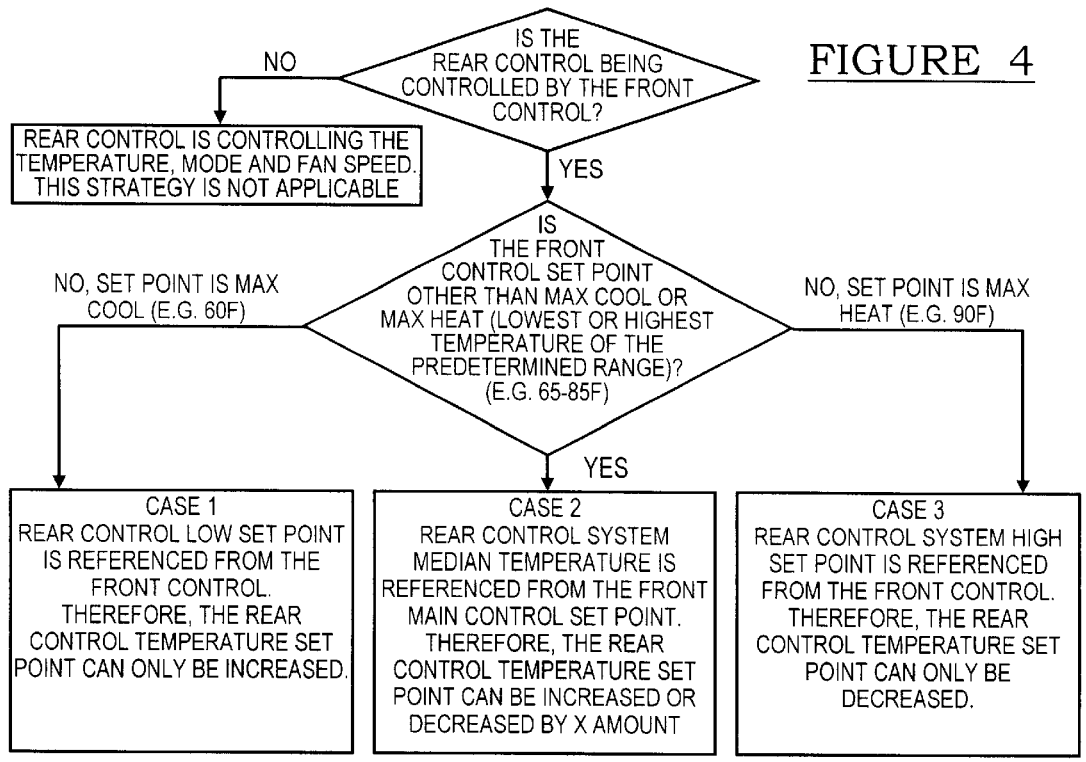
FIG. 4 is a flow chart representation of the control strategy of the rear control system in accordance with the teachings of the present invention.
Figure 4:
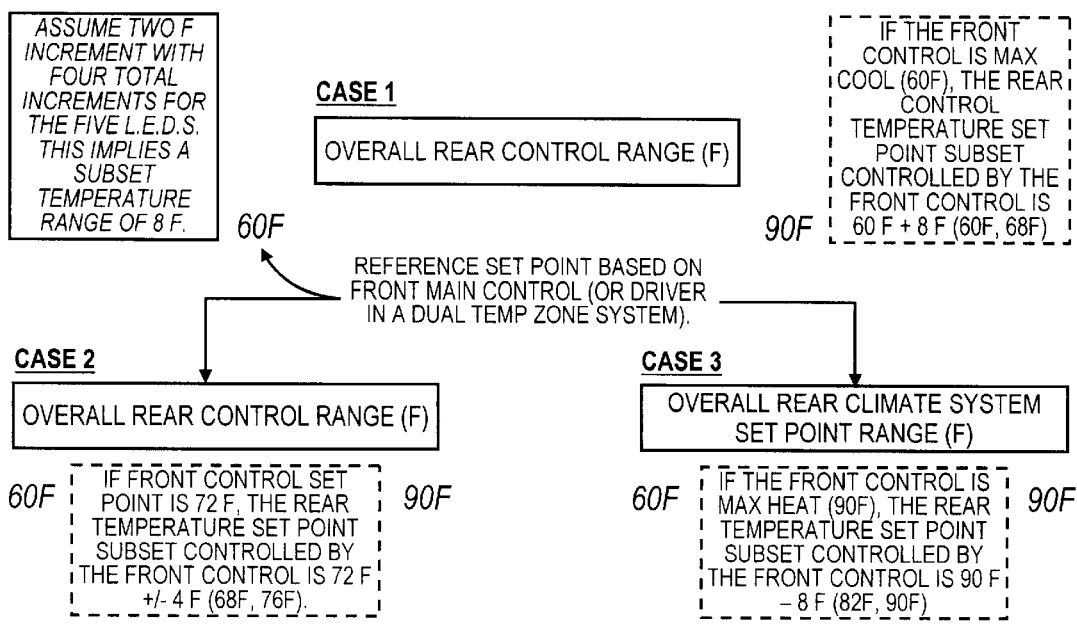

With reference to FIG. 4, if the front control is selected to a set point of 70° F. The median rear temperature would be the same 70° F. The front control 50 has the ability to increase or decrease the set point of the rear control 52 referenced from the front set point. If the front control 50 selected a set point of 75° F., the median temperature for the rear control 52 would change to 75° F. and the actual discharge temperature would change since the median reference changed.

In order to explain how the rear control 52 reference point is set by the front control 50, 3 different examples are presented. These examples are only to illustrate the point and are in no way limiting the present invention. In Case 1 let us assume that the front control selected the extreme cold set point (i.e. 60° F.). In Case 2 let us assume that the front control temperature set point is 72° F. and in Case 3 let us assume that the front control is selected at extreme hot set point (i.e. 90° F.). Further, assume that for all the three cases there is a 2° F./increment with 4 total increments. This implies a subset temperature range of +/−8° F. In the first case since the front control is selected at the extreme cold set point (i.e. 60° F.) the rear system reference would change to the low end and therefore the temperature of the rear control can only be increased from this reference point. Therefore the temperature range of the rear control is 60° F. to 68° F. Similarly, in the second case, since the front control set point is the median reference point of the rear control, and the temperature can be increased or decreased from this reference point. Therefore, the temperature range of the rear control is 68° F. to 76° F. On the other hand, in Case three where the front control is selected at extreme hot set point (i.e. 90° F.) the rear system reference would change to the high end and therefore the temperature of the rear control can only be decreased from this reference point. This implies a subset temperature range of −8° F., therefore the temperature range of the rear control is 82° F. to 90° F. Therefore the temperature range of the rear control is 82° F. to 90° F.

As explained above, the button logic and the temperature gradient associated per push button can be easily changed through software logic. For example, in the above cases, if it is desired that the temperature gradient desired 3° F. instead of 2° F., or some proportional change per step, merely changing the software logic can do this.

As any person skilled in the art will recognize from the previous description and from the figures and claims, modifications and changes can be made to the preferred embodiment of the invention without departing from the scope of the invention as defined in the following claims.

What is claimed is:

1. A process of controlling the temperature of air discharged to a rear interior of a motor vehicle, the process comprising:

providing a front control heat ventilation air conditioning system capable of operating within a pre-determined temperature range;

selecting a temperature set point within the pre-determined temperature range;

setting a temperature range for a rear control heat ventilation air conditioning system, wherein the temperature range for the rear control heat ventilation air condition system references the temperature set point such that the temperature range of the rear control heat ventilation air conditioning system is a subset of the pre-determined temperature range; and restricting the temperature range for the rear control heat ventilation air condition system based on the temperature set point.

2. The process of claim 1, wherein the front control heat ventilation air conditioning system controls the temperature of air discharged to a front interior of the motor vehicle.

3. The process of claim 1, wherein the rear control heat ventilation air conditioning system controls the temperature of air discharged to the rear interior of the motor vehicle.

4. The process of claim 1, wherein the step of selecting the temperature set point includes the step of selecting the temperature set point corresponding to a lower limit of the pre-determined temperature range.

5. The process of claim 4, wherein the temperature for the rear control heat ventilation air conditioning system can only be increased when the temperature set point is selected at the lowest temperature of the pre-determined temperature range.

6. The process of claim 1, wherein the step of selecting the temperature set point includes the step of selecting the temperature set point corresponding to an upper limit of the pre-determined temperature range.

7. The process of claim 6, wherein the temperature for the rear control heat ventilation air conditioning system can only be decreased when the temperature set point is selected at the highest temperature of the pre-determined temperature range.

8. The process of claim 1, further comprising providing an interface to the rear control heat ventilation air conditioning system levels at equal temperature increments across the range of the rear control heat ventilation air conditioning system.

9. The process of claim 1, wherein the median of the temperature range of the rear control heat ventilation air conditioning system is based on the temperature set point.

10. The process of claim 1, wherein the temperature range of the rear control heat ventilation air conditioning system is restricted to about +/−8° F.

* * * * *